United States Patent [19]
von Greyerz

[11] 4,016,778
[45] Apr. 12, 1977

[54] WORM DRIVE HYDRAULIC AUTOMATIC TRANSMISSION

[76] Inventor: John W. von Greyerz, 55 W. Rahn Road, Dayton, Ohio 45429

[22] Filed: Apr. 4, 1975

[21] Appl. No.: 564,875

[52] U.S. Cl. .............................................. 74/687
[51] Int. Cl.² ...................................... F16H 47/04
[58] Field of Search ........... 74/724, 730, 687, 731, 74/770, 720.5, 720

[56] References Cited
UNITED STATES PATENTS

| | | | |
|---|---|---|---|
| 2,171,146 | 8/1939 | Montelius | 74/687 |
| 2,246,018 | 6/1941 | Snyder | 74/730 |
| 2,638,796 | 5/1953 | Black | 74/730 X |
| 3,023,638 | 3/1962 | Westbury et al. | 74/687 |

OTHER PUBLICATIONS

"Torque Converter," in *Product Engineering*, Feb. 1948, in Designs, U.S.A. p. 97.

*Primary Examiner*—Samuel Scott
*Assistant Examiner*—Frank H. McKenzie, Jr.

[57] ABSTRACT

This disclosure is directed to an improved transmission providing a substantially infinite motor to drive axel gear ratio capable of automatically adjusting itself under a wide variety of conditions. The transmission of this invention is comprised of three distinct operational units, the torque converter or fluid drive, the worm drive unit and the gear box unit. The transmission while in drive, is capable of providing substantially an extreme low motor to rear wheel ratio which can vary through any ratio necessary under particular driving conditions up to approximately a 1-to-1 ratio.

3 Claims, 5 Drawing Figures

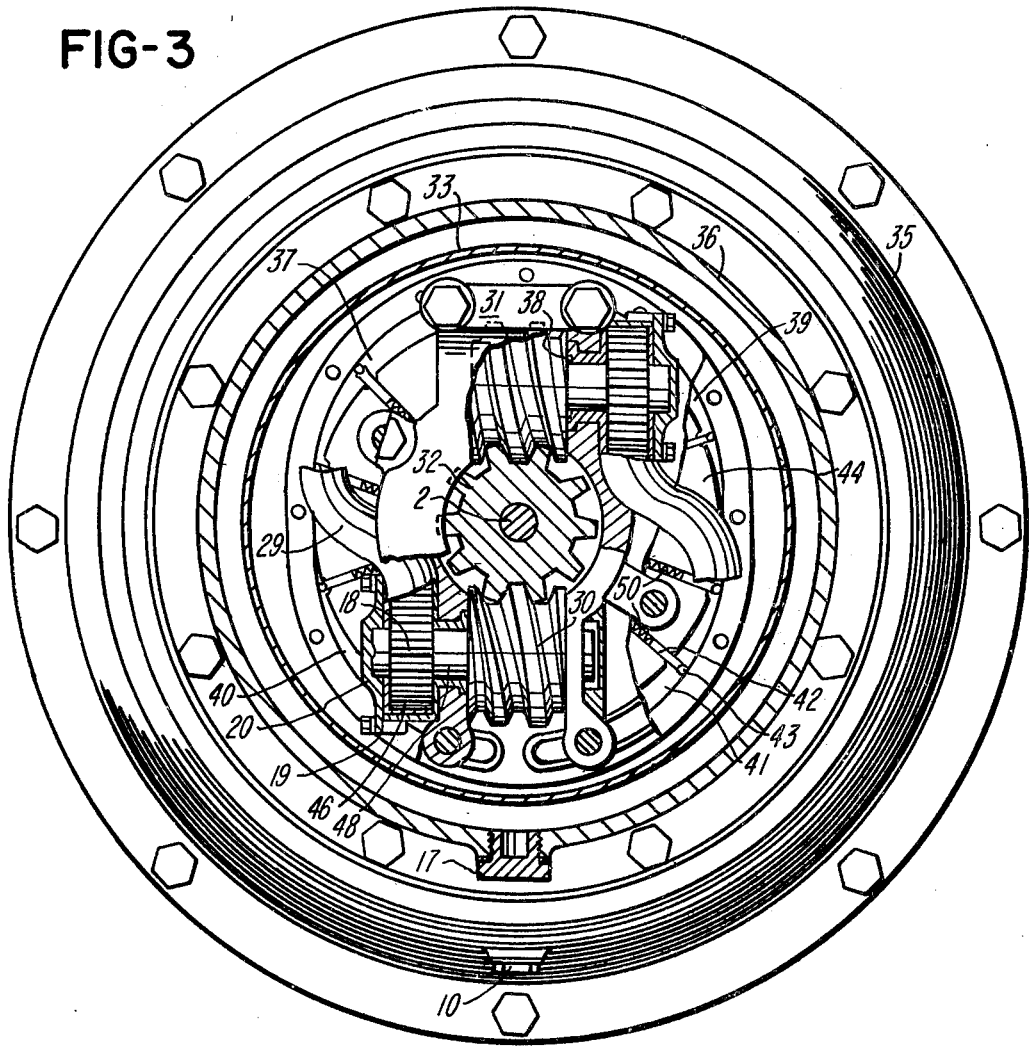
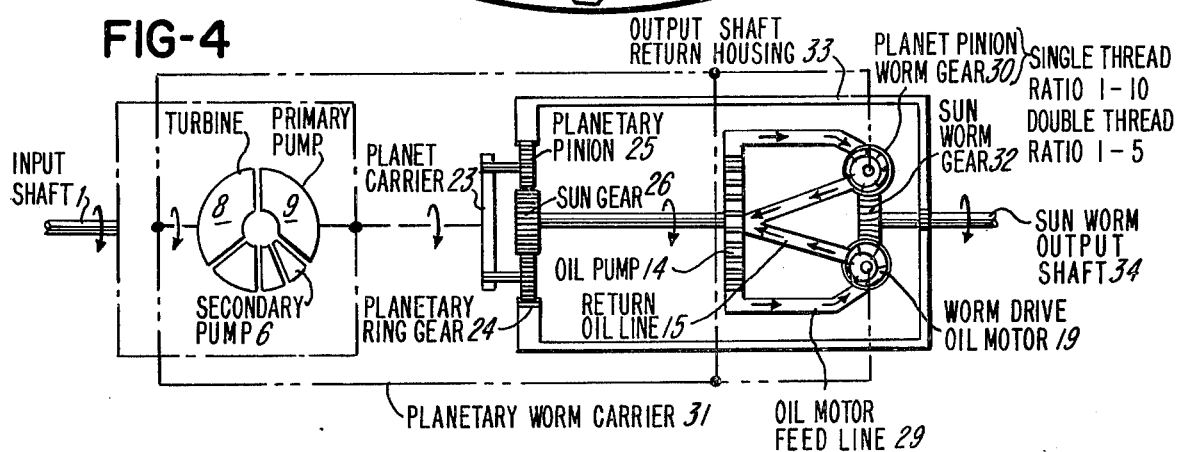

WORM DRIVE HYDRAULIC AUTOMATIC TRANSMISSION

The transmission of this invention utilizes a 5-member torque converter in accordance with a preferred embodiment to secure added power and operational flexibility.

The invention will be understood in more detail in reference to the accompanying drawings.

FIG. 1A of the drawing is a sectional view through one-half of the transmission of this invention.

FIG. 3 is a cross-sectional view of the planetary worm gear arrangement taken along line 3—3 of FIG. 1A.

FIG. 4 is a diagrammatic view illustrating the direction of movement of the main transmission members.

Figure 1A:
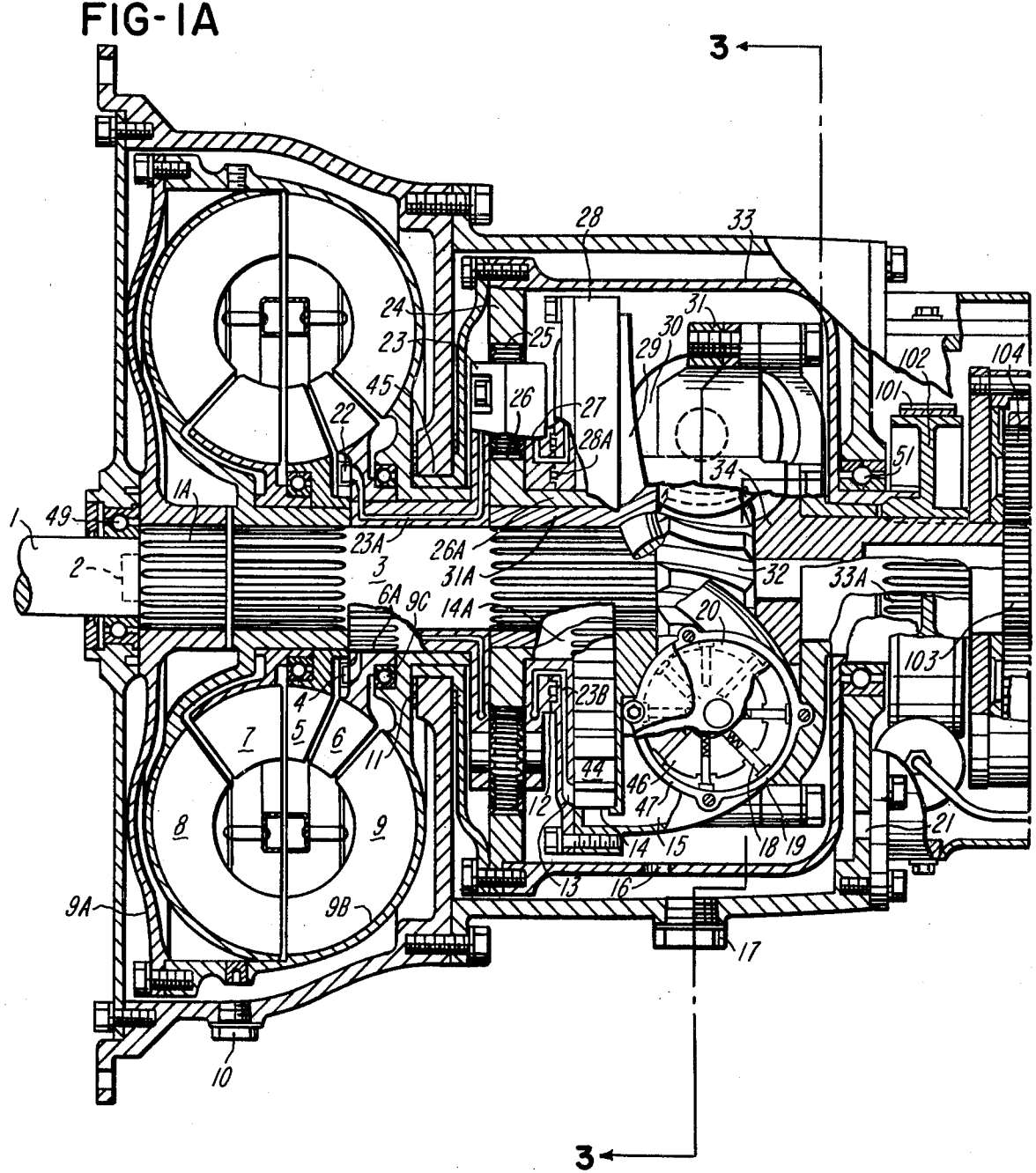
FIG. 1B is a sectional view through the remaining half of the transmission.

As will be noted from FIG. 1A, input shaft 1, having splines shown at 1A, is driven by the power source and stabilized by the forward stabilizer shaft 2. Shaft 1 is coupled to primary pump 9 via forward housing 9 through the splines 1A. Primary pump 9 is attached to housing 9A, which then surrounds the inner shaft of the transmission being supported by bearing 45.

The rotary motion of primary pump 9 causes the secondary pump 6 to rotate with it. Under load, the secondary pump 6 will run faster than the primary pump 9 due to the torque converter action.

Over running clutch bearing 9C will permit the secondary pump 6 to run faster than primary pump 9 but not slower. This action is standard in most torque converters presently in use.

Secondary pump 6 in turn drives the planetary housing 23 via shaft 23A which in turn is splined to secondary pump planet carrier spline 6A. Planetary housing 23 always revolves with input shaft 1. Under load conditions planetary housing 23 runs faster (than a no-loan condition) due to secondary pump 6 so as to enable it to overrun primary pump 9.

In an alternative embodiment, planet carrier shaft 23A can be splined to primary pump 9 and primary pump housing 9B instead of planet carrier spline 6A of secondary pump 6. This alternative arrangement is utilized when added load hinders the overrunning feature of secondary pump 6 to a large extent. The rotation of planetary carrier 23 causes gear action within the planetary gears. Planet pinion gear 25 revolves between the planetary ring gear 24 and the sun gear 26. Planetary ring gear 24 is attached to the output shaft return housing 33 which in turn is splined to the sun worm output shaft 34 at splined portion 33A.

Planetary ring gear 24 revolves at substantially the same speed as the output shaft and the drive axle in cases where a 1-to-1 ratio differential is employed. Under load conditions, planet pinion gear 25 is caused to orbit in the same direction as the motor, yet revolve in the opposite direction as that of the motor thereby causing sun gear 26 to revolve in the same direction as the motor only at a higher rate of speed. By utilization of the output shaft return housing 33 to obtain added gear rotation in the planet carrier 23 commensurate with speed and load conditions, lower motor to output shaft gear ratios are obtainable upon increasing fuel input resulting in greater and more responsive acceleration. This will be elaborated upon hereinbelow.

Sun gear 26 is directly connected to sun gear shaft 26A which in turn is splined to oil pump 14 at splined portion 14A permitting it to drive oil pump 14. Oil pump 14 revolves within oil pump housing 28 which is a part of or can be directly connected to the planetary worm carrier 31. Under load, oil pump 14 revolves much faster than housing 28 and planetary worm carrier 31. The power required to drive planet carrier 31 and oil pump 14 is directly applied to the output shaft 135 through the planetary ring gear 24 and output shaft return housing 33.

The initial oil pump action draws oil from oil intake flange 22 through single intake oil port 27 into the pump area. The return oil port flange 4 and return oil port 13 are located opposite the intake for assuring proper balance. Additional oil ports can be employed to achieve a greater extent of cooling, as the situation requires. It should be noted that the intake and return oil ports are separated from one another and pass through the planet carrier shaft 23A through the planet carrier and into pump housing 28. Alternatively, planet carrier 23 with its corresponding oil ports can be made to pass directly through planet carrier shaft 23A, planet worm carrier shaft spline portion 31A and sun gear shaft 26A to and from the oil pump, respectively. Oil seal 12 or any equivalent, is utilized between the planet carrier 23 and oil pump 28 inasmuch as these two units rotate at different speeds when under load.

A 360° return oil slot 28A and planet carrier intake oil slot 23B are located in adjoining member surfaces in such manner as to permit intake and return oil to flow uninterruptedly from planet carrier 23 and oil pump 14 without interfering with each other.

Oil pump 14 rotates in the same direction as the motor. Of course, a variety of differently designed oil pumps can be utilized in accordance with this invention. Usually, however, the pump has a dual intake area and a dual exhaust area if it is to drive 2 oil motors and utilizes some form of retractable vanes 42 to assure positive action and driving the two worm drive oil motors 19. The inside rotor or hub, 44, of the pump, is preferably round and revolves within the oil pump housing 28. These retractable vanes with the hub are provided with needle bearings 43 at their outer extremities to enhance their wearing properties. The needle bearings can vary in number and size depending upon the particular vehicle involved. These retractable vanes operate in the ellipsoidshaped housing area comprised of the two intake chamber portions 39 and 40 and the two compression and exhaust chambers 37 and 41. These retractable vanes are of such configuration as to operate against the inner wall area of the pump due to centrifugal force combined with pressure from the vane springs 50. The oil pump housing 28 can be made integral with or a part of or otherwise connected to planetary worm carrier 31.

At complete stops or when the transmission is under load, oil pump 14 operates faster than the associated housing 28 and the carriage 31 which results in oil being pumped rapidly from said pump through the oil motor feedlines 29 into the worm drive oil motors 19 from whence it is returned to oil pump 14 through return oil lines 15. As noted in FIG. 1A of the drawing, these return oil lines can be of flared configuration. Various particular configurations can be employed in place of those shown in FIG. 1A for worm drive oil motors 19 in accordance with this invention.

The worm drive oil motor 19 is preferably constructed of material and in a configuration similar or complementary to that of the oil pump 14. This motor 19 has a round hub or rotor 46 which accommodates a plurality of retractable vanes. Rotor 46 is eccentric in housing 47. As shown in FIG. 1A, housing 47 has a rounded configuration and encloses all the moving parts of the motor, hub and vanes. Vane guide 20 rotates approximately in the center of the unit and prevents vanes 18 from contacting the inner wall of the housing 47 thus providing longer operational life and reasonably quiet operation.

Oil pump 14 and the worm drive oil motors 19 draw oil or other transmission fluid from the torque converter zone, eg., as shown at the left hand portion of FIG. 1A at oil flange 22 and ultimately returns it to the opposite side of the torque converter at oil flange 4. These units operate within the worm drive unit area which customarily utilize hypoid oil for lubrication. Of course, under this operational condition, it is necessary to insure that the units are tightly fitting and that the oil seals, such as those shown at 12 and 38, are likewise tightly fitting in order to prevent mixing of the transmission fluid with the hypoid oil and vice versa.

Rotors 46 on the oil motors are attached to, or can be made a part of or integral with, the planet pinion worm gears 30. These rotors are mounted in bearings 48 and are supported by planetary worm carrier 31. Rotation of the oil motors thus causes rotation of the planet pinion worm gears 30.

While the vehicle is motionless with the motor running and in gear (or under heavy load), the planet pinion worm gears 30 rotate at a rapid rate. Rotation of these worm gears permits fairly rapid rotation of the supporting carrier 31 without rotation of the sun worm gear 32. Of course, under no circumstances do the worm gears 30 drive either the sun worm gear 32 or the planetary worm carrier 31. Instead, worm gears 30 act substantially as a governor or sliding clutch between carrier 31 and sun worm gear 32. This key function of worm gears 30 serving as a governer or sliding clutch provides a functional and structural arrangement differing from other gear arrangements utilized in the prior art.

Rotation of input shaft 1 and primary pump 9 causes turbine 8 to revolve. During acceleration or when the transmission is under load, the speed of revolution of turbine 8 is somewhat less than that of primary pump 9. As shown in FIG. 1A, turbine 8 is splined to turbine shaft 3 which in turn is splined to planetary worm carrier 31. Rotation of turbine 8 at any given speed causes rotation of planetary worm carrier 31 at the same speed as that of turbine 8. The difference in speed of rotation between planet worm carrier 31 and sun worm gear 32 with its associated output shaft 34 depends upon the rotational speed of the planet pinion worm gears 30.

This is another unique structural and positional arrangement which affords a function in the transmission of this invention which is not believed to be capable of attainment in prior art transmissions. Thus, under load and during acceleration, the turbine in the torque converter is permitted to run intentionally at a fairly high percentage of the comparative speed of the primary pump to reduce oil velocity and turbulence thereby producing a high rate of torque without overheating the torque converter which in turn would apply torque directly to the planetary worm carrier 31. Planetary worm carrier 31 is permitted to revolve fairly rapidly due to the rapid action of planet pinion worm gears 30. That torque thus generated is then applied to sun worm gear 32 and its associated output shaft 34.

Turbine 8 applies constant torque to the planetary worm carrier 31 which in turn applies maximum torque to sun worm gear 32 through the sliding clutch governor type action of planet pinion worm gears 30, while under load, or through to a light load, viz., 1-to-1 ratio condition.

Through revolving of the planet pinion worm gears 30, at a given rate of speed, the turbine to output shaft ratio can vary over an extremely high upper range or as an example a range approximating from 100-to-1 to 1-to-1 depending upon load conditions without shifting gears or without placing undue strain or conditions generating overheating of the torque converter. This is an advantage of this invention which is not believed to be possessed by conventional transmissions such as utilized in the prior art.

The allowable differences in speed between primary pump 9 and turbine 8 can be governed by the variation of the size or configuration of the planetary gear assembly 23, planetary ring gear 24 and planet pinion gear 25 in relation to the sizes of the oil pump 14, worm drive oil motor 19, planet pinion worm gears 30, and sun worm gear 32.

According to a preferred embodiment of this invention, the comparative sizes of the worm drive oil motors 19 are varied in accordance with FIG. 4. FIG. 4 and below table 1 clarifies the primary pump-turbine lag and gear action under load with the output shaft 34 at a standstill. As an alternative embodiment, the carrier 23 can be splined to primary pump 9 or secondary pump 6.

To further clarify the variations in Table 1, the following action takes place in the 9% variation. With the output shaft 34 at a standstill and the input shaft 1 revolving one revolution, it also revolves the primary pump 9 and planet carrier 23 one revolution. With the planetary ring gear 24 also stationary with the output shaft, the planetary pinion gears 25 are made to revolve in the opposite direction, but orbiting in the same direction thereby causing sun gear 26 and oil pump 14 to revolve approximately 2.6 times.

TABLE 1

| FOR THIS VARIATION - CARRIER 23 SPLINED TO PRIMARY PUMP 9 |
|---|

| OUTPUT SHAFT (34) AT "0" RPM-PLAN. CARR. (31) SUN GEAR (26) RATIO 1 to 2.6 RPM - WORM GEARS SINGLE THREAD OIL PUMP (14) SIZED TO REVOLVE OIL MOTOR (19) APPROX. 9 REVOLUTIONS TO 2.6 REV. |
|---|

| APPROX. REV. PER MINUTE 9% PRIMARY PUMP - TURBINE LAG | | | | | | |
|---|---|---|---|---|---|---|
| 1 | 8 & 31 | 9 | 23 | 26 & 14 | 19 | 24 & 32 & 34 |
| ENG. & | TURB. & | PRIM. | PLANET | SUN GEAR | WORM DRIVE | OUTPUT |
| INPUT SHAFT | PLANET CAR. | PUMP | CAR. | OIL PUMP | OIL MOTOR | SHAFT ETC. |

TABLE 1-continued

| | | | | | | |
|---|---|---|---|---|---|---|
| 1 | .9 | 1 | 1 | 2.6 | 9 | 0 |
| 10 | 9 | 10 | 10 | 26 | 90 | 0 |
| 100 | 90 | 100 | 100 | 260 | 900 | 0 |
| 1000 | 900 | 1000 | 1000 | 2600 | 9000 | 0 |

OIL PUMP (14) SIZED TO REVOLVE OIL MOTOR (19) APPROX. 17 REVOLUTIONS to 2.6 REV.

APPROX. REV PER MINUTE 28% PRIMARY PUMP - TURBINE LAG

| | | | | | | |
|---|---|---|---|---|---|---|
| 1 | .7 | 1 | 1 | 2.6 | 7 | 0 |
| 10 | 7 | 10 | 10 | 26 | 70 | 0 |
| 100 | 70 | 100 | 100 | 260 | 700 | 0 |
| 1000 | 700 | 1000 | 1000 | 2600 | 7000 | 0 |

Referring to Table 1, it can be seen that a transmission with the input shaft revolving at approximately 1000 R.P.M. and having approximately a 9% lag at full load between the main torque converter units, there is a difference of approximately 90 R.P.M. In the case of the one having approximately a 28% lag there is a difference of approximately 280 R.P.M. The torque generated as a result of these differences in speed is applied to the sun worm gear 32 through planet pinion worm gears 30 and planetary worm carrier 31. As for example, if planetary worm carrier 31 is revolving five times as fast as the sun worm gear 32 and associated output shaft 34 and given a difference of approximately 200 R.P.M. in the torque converter, regardless of its speed, the torque thus generated is applied to the sun worm gear 32 giving it more than an approximate 5 to 1 motor to output shaft ratio at that point.

The desired speed of planet pinion worm gears 30 is dictated by the width and diameter of oil pump 14 relative to the width and diameter of worm drive oil motors 19. The ratio can be made to vary considerably. The size of oil pump 14 relative to the size of oil motors 19 will also depend on whether planet pinion gears 30 and sun worm gear 32 has single or double threaded gears as well as their comparative size or ratio.

For this variation, with oil pump 14 properly sized and revolving approximately 2.6 times, oil motors 19 revolve rapidly causing planetary worm carrier 31 to revolve approximately nine-tenths of a revolution. Since planetary worm carrier 31 is attached or can be made a part of oil pump housing 28, the nine-tenths of a revolution it made must be deducted from the 2.6 revolutions the internal pump 14 made for a net gain of approximately 1.7 revolutions. With oil pump 14 having a net gain of 1.7 revolutions it must pump a sufficient amount of oil to revolve worm drive oil motor 19 approximately nine times. Sun worm gear 32 for this example has 10 teeth and planet pinion worm gears 30 must revolve 10 times to make a complete revolution. Under these circumstances, it revolves approximately nine times or approximately 90% of the revolution which means the planetary worm carrier 31 and turbine 8 lagged the primary pump 9 by nine percent and revolved with it while the primary pump 9 revolved one full revolution. From the above, it can be seen that the turbine can be designed to rotate at a given percentage of the primary pump under full load, based on the relative pump and gear ratios involved.

Instead of using single thread worm gears, double threaded worm gears can be utilized provided that the oil pump 14 and oil motor 19 are proportionally sized to reduce the oil motor speed proportionally. Worm gears 30 are threaded, e.g., as shown in FIGS. 1A and 3, in an arcuate configuration so as to cause revolution of the planetary worm carrier 31 in the same direction as that of the motor, turbine and output shaft.

When the transmission is under load, the planet pinion worm gears 30 are precluded from revolving at a speed which would permit planet worm carrier 31 and turbine 8 to revolve at the same speed or faster than primary pump 9. This is accomplished in accordance with this invention by sizing oil pump 14 and worm drive oil motors 19 with proper ratio in respect to each other. As for example, if oil pump 14 was improperly sized with respect to oil motors 19 and caused them to revolve more than 10 times, this would make planet pinion worm gears 30 to revolve more than 10 times causing planetary worm carrier 31 and turbine 8 to revolve a full turn along with primary pump 9. Under this condition, the transmission would not have the ability to propel itself out of low gear nor would it apply any torque to the sun worm gear 32.

The allowable lag, when the transmission is at or substantially at full load, between the two main torque converter units is specifically provided within the range of approximately five percent to approximately 50 percent depending on the size and weight of the vehicle and the power or performance criteria which the vehicle is required to attain.

As mentioned previously, changing the size of oil pump 14 and/or changing the size of worm drive oil motors 19 effectively changes the allowable lag between the units in the torque converter. Table 2 shows the effect of changing the oil pump to oil motor ratio and the resultant primary pump-turbine lag.

Referring to Table 2, and assuming a 23% primary pump-turbine lag as a given variation, the following action takes place: Input shaft 1, making one revolution, revolves primary pump 9 and planet carrier 23 one revolution. Since output shaft 34 and associated planetary ring gear 24 is stationary at this time, sun gear 26 and oil pump 14 make a maximum of approximately 2.6 revolutions. The oil pump housing 28 is a part of or can be connected to the planetary worm carrier 31 which revolves slower than the internal oil pump 14 and associated rotor 44 while under load. In this case it will make approximately 0.77 of a revolution.

TABLE 2

FOR THIS VARIATION - PLANET CARRIER 23 SPLINED TO PRIMARY PUMP 9

TRANSMISSION GEAR AND PUMP ACTION AT FULL LOAD, INPUT SHAFT

TABLE 2-continued

| MAKING 1 FULL REVOLUTION - OUTPUT SHAFT AT STANDSTILL | | | | | | |
|---|---|---|---|---|---|---|
| 1 & 9 & 23 INPUT SHAFT PLANET CAR. PRIMARY PUMP | 26 % 14 SUN GEAR OIL PUMP REVS. | 31 PLAN. WORM CAR. REV. | 14 EFFECTIVE OIL PUMP REVS. | OIL PUMP TO OIL MOTOR RATIO | 19 & 30 OIL MOTOR PLAN. PIN WORM GEAR | PRI. PUMP TURBINE APPROX. % LAG |
| 1 | 2.6 | .9 | 1.70 | 1 to 5.29 | 9.0 | 9% |
| 1 | 2.6 | .84 | 1.76 | 1 to 4.77 | 8.4 | 16% |
| 1 | 2.6 | .77 | 1.83 | 1 to 4.21 | 7.7 | 23% |
| 1 | 2.6 | .72 | 1.88 | 1 to 3.83 | 7.2 | 28% |
| 1 | 2.6 | .67 | 1.93 | 1 to 3.47 | 6.7 | 33% |
| 1 | 2.6 | .63 | 1.97 | 1 to 3.20 | 6.3 | 37% |

Deducted from the approximate 2.6 revolutions oil pump 14 made results in approximately 1.8+ effective revolutions to drive oil motors 19. It then drives them a total of approximately 7.7 revolutions. This would be an oil pump to oil motor ratio of approximately 1 to 4.21. If double threaded worm gears are used this ratio can be cut in half. The rotors 46 of oil motors 19 are directly connected or are a part of planet pinion worm gears 30 which must revolve a full 10 turns for the planetary worm carrier 31 to make a full revolution around sun worm gear 32. With planet pinion worm gears 30 making 7.7 revolutions, it permits the planetary worm carrier 31 and associated turbine 8 to make approximately 77 percent of one complete revolution. Turbine 8 therefore lagged the primary pump approximately 23 percent. The comparative sizes of oil pump 14 and oil motors 19 are governed by the horsepower of the driving engine, the size of the transmission, the weight of the vehicle and the job or performance desired based on the primary pump-turbine lag.

When sufficient torque is applied to sun worm gear 32 and associated output shaft 34, the vehicle begins to move and picks up speed as it travels along. As this happens, output shaft housing 33 revolves at the same speed as the output shaft since it is splined to neutral brake shoe 102, which in turn is splined to output shaft 34. Planetary ring gear 24 is bolted (or secured in equivalent manner) to output shaft return housing 33 as it picks up rotational speed, planet pinion gears 25 reduce their speed thereby reducing the speed of the oil pump oil motors and planet pinion worm gears 30. This results in gradual reduction in the gear action permitting turbine 8 to attain the same speed as primary pump 9.

Under light load conditions, the torque converter and entire worm drive unit revolves as a single unit, viz., at the same speed. All gear action and pump action ceases under this operational condition until a change in grade under which the vehicle is traveling demands a lower gear ratio. The transmission automatically adjusts itself to the demand. In circumstances where a rapid acceleration or burst of speed is required, such as for passing another vehicle, acceleration of the motor causes primary pump 9 and planet carrier 23 to increase speed thereby causing more rapid rotation of sun gear 26. This rapid rotation in turn causes corresponding rapid rotation of oil pump 14, oil motor 19 and planet pinion worm gears 30. The increased planet pinion worm gear rotation permits the planetary worm carrier 31 to revolve more rapidly than the output shaft yet more slowly than the primary pump. The added speed and torque from the turbine 8 is then directly applied to the output shaft through the planetary worm carrier 31 and associated worm gears 30 and 32. Worm gear 30 revolves on its axle as a result of the oil motor driving it.

Under such operational conditions, there is a reverse propulsion of sun worm gear 32 sufficiently to allow planet worm carrier 31 to revolve at a slightly reduced speed as compared to the motor, yet at the same time effectively drag the sun worm gear 32 forward with it at a much slower speed, viz., than the speed of oil pump 14 or planet carrier 23, and in the same direction as the motor thereby causing application of a considerable amount of torque to the output shaft.

Forward bearing 49, middle bearing 45 and rear bearing 51 support the entire forward part of the transmission. Central stablizing shaft 2 is free moving and provides added stability to the transmission moving parts.

As stated previously, double threaded worm gears can be used in the planet pinion worm gears 30 and associated sun worm gear 32 in lieu of single threaded gears. Use of double threaded worm gears permits planet pinion worm gears 30 to halve the number of revolutions since for every revolution it travels the width of two threads rather than one, viz., twice the distance. To halve the speed, oil pump 14 and oil motors 19 are sized accordingly. Due to the more accentuated arcuate configuration, the double threaded worm gears require less torque to revolve then single threaded gears. Table 3 illustrates the effects on oil motors 19 and associated planet pinion worm gears 30 when in operation and compares the use of single threaded gears with double thread. It can be seen that double threaded worm gears do not revolve as fast and would be more suitable for most applications.

TABLE 3

| FOR THIS VARIATION - PLANET CARRIER 23 SPLINED TO PRIMARY PUMP 9 | | | | | | |
|---|---|---|---|---|---|---|
| 5 TO 1 MOTOR TO OUTPUT SHAFT RATIO APPROX. REV. PER MIN. 16% MAX. PRIMARY PUMP - TURBINE LAG | | | | | | |
| 1 ENGINE & INPUT SHAFT RPM | 8 + 31 TURBINE & PLANET CARRIER RPM | 9 + 23 PRIM. PUMP PLANET CAR. RPM | 26 + 14 SUN GEAR OIL PUMP RPM | 30 PLAN. PIN SGL. THRD. RPM | 30 PLAN. PIN DBL. THRD. RPM | 24 + 32 + 34 PLAN. R.G. SWG + OPS RPM |

TABLE 3-continued

| 10 | 8.4 | 10 | 22 | 64 | 32 | 2 |
|---|---|---|---|---|---|---|
| 100 | 84 | 100 | 219 | 640 | 320 | 20 |
| 500 | 420 | 500 | 1094 | 3200 | 1600 | 100 |
| 1000 | 840 | 1000 | 2187 | 6400 | 3200 | 200 |
| 2000 | 1680 | 2000 | 4374 | 12800 | 6400 | 400 |

Table 4, shown below, illustrates the effect on movable parts at a constant 1000 R.P.M. starting from a 100-to-1 motor to output shaft ratio to a 1-to-1 ratio.

TABLE 4

FOR THIS VARIATION - PLAN. CARRIER 23 SPLINED TO PRIMARY PUMP 9

RELATIVE PUMP & GEAR SPEEDS WITH ENGINE SPEED at 1000 RPM
APPROX. REV PER MIN at VARIABLE PRIMARY PUMP - TURBINE LAG

| MOTOR TO OUTPUT SHAFT RATIO | 8 & 31 TURB. & PLAN. CAR. RPM | | 9 & 23 PRIM. PUMP PLAN. CAR. RPM | 26 & 14 SUN GEAR OIL PUMP RPM | 30 PLAN. PIN SGL. THRD. RPM | 30 PLAN PIN DBL THRD RPM | 1 ENGINE & INPUT SHAFT RPM | 24 + 32 + 34 PLAN. R.G. SWG + OPS RPM |
|---|---|---|---|---|---|---|---|---|
| 100-1 | 10% | 900 | 1000 | 2774 | 8900 | 4450 | 1000 | 10 |
| 50-1 | 10% | 900 | 1000 | 2753 | 8800 | 4400 | 1000 | 20 |
| 10-1 | 10% | 900 | 1000 | 2584 | 8000 | 4000 | 1000 | 100 |
| 5-1 | 5% | 950 | 1000 | 2529 | 7500 | 3750 | 1000 | 200 |
| 3-1 | 3% | 970 | 1000 | 2311 | 6370 | 3185 | 1000 | 333 |
| 2-1 | 2% | 880 | 1000 | 1990 | 4800 | 2400 | 1000 | 500 |
| 1.5-1 | 1% | 990 | 1000 | 1495 | 2400 | 1000 | 1000 | 750 |
| 1-1 | 0% | 1000 | 1000 | 1000 | 0 | 0 | 1000 | 1000 |

The values in table 5 illustrates the approximate oil pump, oil motor and gear speeds as well as miles per hour in a simulated condition closely resembling what could be an actual condition for a vehicle having tires or wheels 18 inches in outside diameter and a 1-to-1 ratio differential.

TABLE 5

FOR THIS VARIATION - PLAN CARRIER 23 SPLINED TO PRIMARY PUMP 9

RELATIVE PUMP & GEAR SPEEDS WITH CHANGING ENGINE SPEEDS

| MOTOR TO OUTPUT SHAFT RATIO | 8 & 31 TURB. & PLAN. CAR. RPM | | 9 & 23 PRIM. PUMP PLAN. CAR. RPM | 26 & 14 SUN GEAR OIL PUMP RPM | 30 PLAN. PIN SGL. THRD. RPM | 30 PLAN. PIN DBL THREAD RPM | 1 ENG. & INPUT SHAFT RPM | 24 + 32 + 34 PLAN. R.G. SWG + OPS RPM |
|---|---|---|---|---|---|---|---|---|
| 10-1 | *16% | 420 | 500 | 1199 | 3700 | 1850 | 500 | 50 ** 4 |
| 8-1 | *14% | 516 | 600 | 1444 | 4410 | 2205 | 600 | 75 ** 6 |
| 6-1 | *12% | 616 | 700 | 1666 | 4990 | 2495 | 700 | 117**10 |
| 4-1 | *10% | 720 | 800 | 1815 | 5200 | 2600 | 800 | 200**17 |
| 2-1 | * 8% | 828 | 900 | 1624 | 3780 | 1890 | 900 | 450**37 |
| 1.5-1 | * 7% | 884 | 950 | 1412 | 2510 | 1255 | 950 | 630**53 |
| 1.1-1 | * 3% | 970 | 1000 | 1098 | 610 | 305 | 1000 | 909**75 |
| 1-1 | * 0% | 1000 | 1000 | 0 | 0 | 0 | 1000 | 1000**83 |

*Primary Pump - Turbine Lag
**Approx. Miles Per Hour

The gear box associated with the worm drive unit provides the necessary park, reverse, neutral, drive and low gear(s). The low gears are customarily utilized for driving downhill. Conventionally there are two sets of bands involved to stop gear action when engaging and disengaging gears. The brake bands are operated by conventional brake cylinders, brake fluid and twin master cylinders which in turn are actuated by solenoids. The use of such system eliminates the need for full-time oil pumps, which themselves require added power for operation.

The transition from one gear to another is accomplished by either manual or automatic gear shifting mechanisms. A manual shifting mechanism can be by gear shift 122 (FIG. 1B) or by other means such as push buttons, etc. The shifting mechanism is linked to the shifter rod 120 which in turn slides shifter fork 119 and associated synchromeshed coupler 118 to the desired position to engage or disengage the coupling annulus gear, 117. The gear box incorporates a double planetary gear system serving as a low gear unit as well as reverse.

Figure 1B:
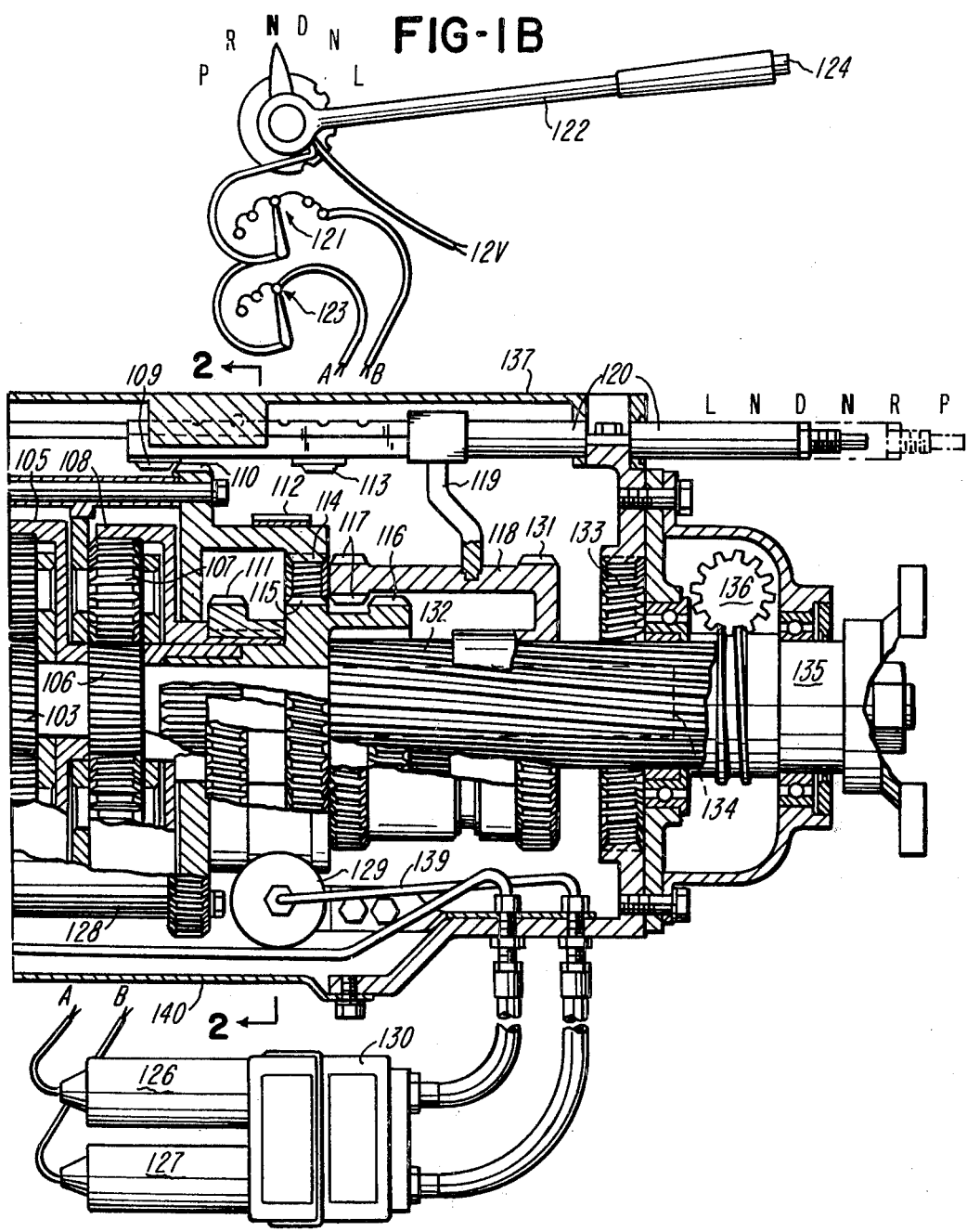
Figure 2:
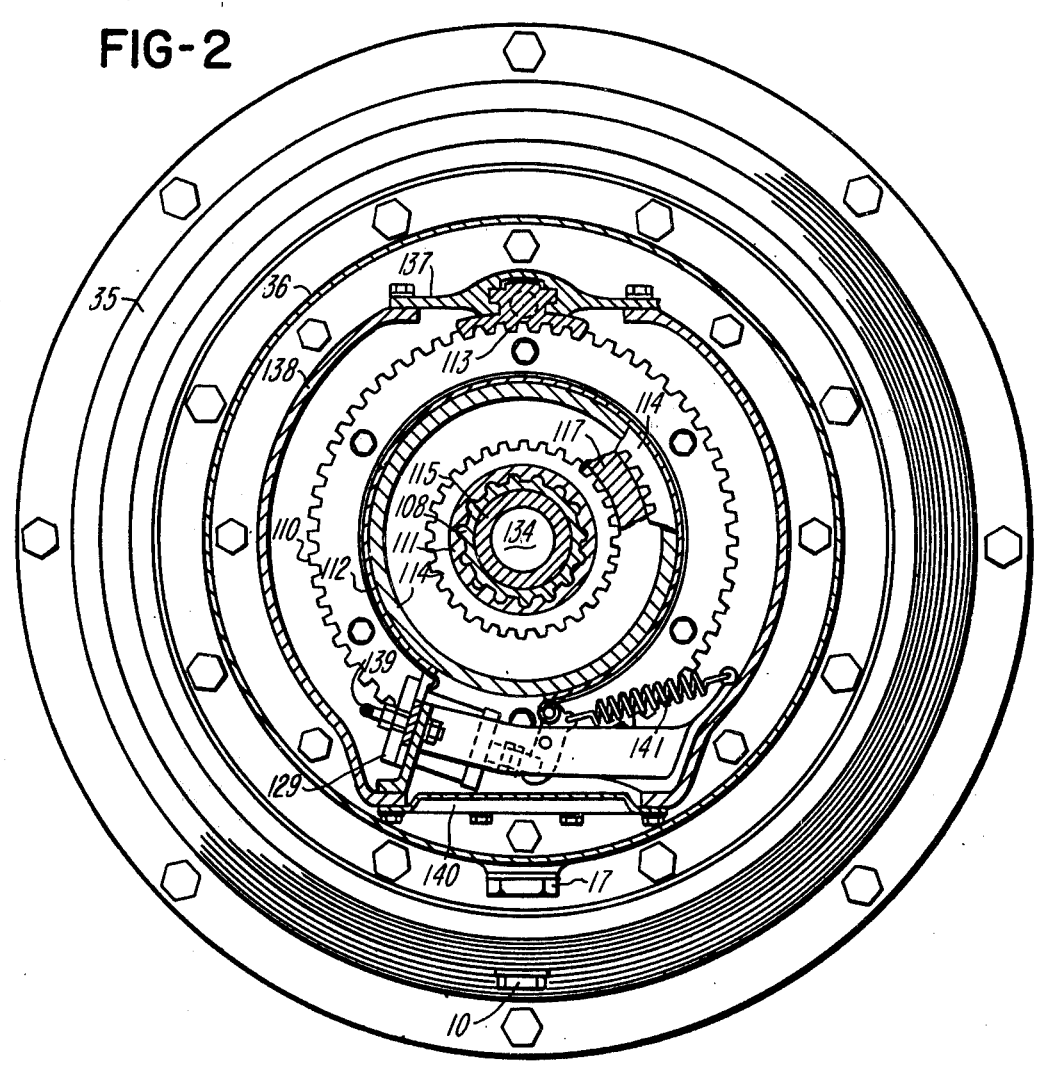
FIG. 2 is a sectional view of the gear box taken along the line 2—2 of FIG. 1B.

FIGS. 1A and 1B of the drawing collectively show the unit in neutral position. Sun worm output shaft 34 has a low-reverse sun gear 103 directly attached thereto. When the transmission is in neutral position, the entire low-reverse planet carrier 128 has a tendency to rotate while the motor is running. Both brake bands are disengaged during this time until switch 124 is depressed. While running in neutral, ring gear 114 and annulus 115 and 116 are revolving. Annulus gear 117, synchromeshed-splined shaft 132 and output shaft 135 are at a standstill.

In order to place the transmission in a drive position, the gear shift lock switchbutton 124 is depressed. In this position, both solenoids 126 and 127 are caused to operate in cooperation with breaking means 112 and 101, thereby braking the planet carrier 128 to a stop. With both solenoids in operation, all gears in the planetary worm gear unit also stop. With planet carrier 128 at a standstill along with ring gear 114 and annulus gear 115, annulus gear 117 is then advanced into the drive position wherein it meshes with outer coupling ring gear 114 and inner coupling annulus gear 115. This meshing action locks the entire planet carrier 128 into a solid unit casing a direct drive from the sun worm output shaft 34 to shaft 135.

With the vehicle transmission in a drive position, when it is desired to shift into low gear, gear shift switch 124 is depressed and the gear shift lever pushed through the neural area where contact is made via switch 121 which activates solenoid 127 and brake band 112. This action slows down and stops planet carrier 128 permitting the gear shift to be advanced into the low position. When the gear shift is fully advanced, the low holding gear 113 meshes with ring gear 110, viz., the low-reverse holding ring gear. This in turn takes over the action of brake band 112 positively holding it in place. With the planet carrier held in place, sun gear 103 causes pinion gear 104 and ring gear 105 to rotate in the opposite direction. Ring gear 105 in turn rotates sun gear 106 in the opposite direction as that in which the motor and transmission is rotating. Pinion gear 107 and ring gear 108 then turn the same direction as that in which the motor is turning. Ring gear 108 is coupled to ring gear 111 which in turn is meshed with annulus gear 117, in the specific gear and transmission arrangement shown in FIG. 1B, this provides approximately an 8-to-1 overall gear reduction. It will be noted that the synchromeshed coupler 118 is meshed with spline output shaft 132 at all gear selection positions.

When shifting from low gear into drive position it is necessary to depress the gear shift switch 124 and advance it into the neutral position and release the switch. This causes planet carrier 128 to accelerate its speed which allows the gear shift to be advanced into drive accompanied by meshing of outer coupling ring gear 114, inner coupling annulus gear 115, and coupler annulus gears 117.

When it is desired to place the transmission into reverse, gear shift switch 124 is again depressed which activates both solenoids and the brake bands and permits reverse coupling annulus gear 116 and coupling annulus gear 117 to be meshed. Reverse holding gear 109 meshes with ring gear 110 which holds planet carrier 128 in place. Sun gear 106 runs in reverse under these conditions and is coupled to annulus gear 116 thereby turning the synchromeshed-splined shaft 132 and shaft 135 in reverse. Pinion gear 107 and ring gear 108 are permitted to run free while in reverse.

Placing the transmission in the parking position is attained by depressing gear shift switch 124 in the neutral position, thereby stopping planet carrier 128. When the gear shift lever is advanced through the reverse position into park, ring gear 131 is meshed with ring gear 133, which in turn is attached (or made integral with or a part of) the housing, thereby locking the output shaft to the casing. When the gear shift switch is subsequently released, planet carrier 128 is permitted to run free thereby permitting selection of either a forward or reverse gearing position.

In retrospect, it will be recalled that turbine 8 powers planetary worm carrier 31 which in turn powers the output shaft 34 and 135. In accordance with this invention, the gear action occuring within planetary worm carrier 31, as it encounters varying load conditions and responds thereto, permits planetary pinion worm gears 30 to function as a governor.

As output shaft speed increases, the load decreases and the turbine equalizes its speed with that of the primary pump, thereby reducing the gear action. As the desired speed is attained under a "no-load condition", there is substantially no gear action, and the entire internal transmission rotates as a solid unit. Due to the ability of the transmission of this invention to respond to slight changes in load conditions coupled with its ability to obtain very low gear ratios, as the occasion requires, without creating undue strain or overheating the torque converter, the present invention provides an effective transmission capable of substantially reducing or eliminating differential gear reductions such as those presently encountered in motor vehicles. One practical result of this is a lessening in fuel consumption in the vehicles incorporating the transmission of this invention. It should be understood that in the planetary gear system 23 (FIG. 1A), it is possible to utilize fiber gears such as nylon, polypropylene, polytetraflourethylene ("Teflon"), glass fiber-reinforced thermosetting or thermoplastic resinous materials, and equivalent materials can be employed to constitute the gears utilized in the planetary gear arrangement, such as shown in FIG. 1A. The use of fiber gears, esp., nylon, enhances the quietness of the transmission.

The transmission set hereinabove is capable of handling requirements for maximum power output under a wide variety of operating circumstances and operational loads. The transmission is rugged enough for utilization in not only passenger transportation vehicles, e.g., automobiles and buses, but also in cargo hauling vehicles, such as trucks or earthmoving equipment and rail equipment as well.

It will be observed that the transmission herein described incorporates the use of a five member torque converter in combination with a planetary worm gear system to provide constant torque on the output shaft from an extremely low gear ratio to approximately a 1-to-1 ratio without the use of bands, oil pumps or shifting gears. It is quickly and automatically sensitive to all changes in grade or circumstances requiring lower gear ratios and continually seeks to return to approximately a 1-to-1 ratio. The use of an oil pump, oil motors and worm gears enables the transmission of this invention to achieve quiet operation in all driving ranges (as compared to known transmissions). Due to its comparatively infinite range of gear ratios, it has the capability of propelling vehicles with a 1-to-1 to 2-to-1 ratio differential and with improved performance. This compares to present vehicles having automatic transmission with ratios of approximately two-to-one to one-to-one in band operated gear shifting steps and differentials with approximately 3.3-to-1 to 5-to-1 ratios. The average vehicle is equipped with a much larger engine than that necessary for the open and level road. Thus, vehicles having differentials with a 1-to-1 to 2-to-1 gear ratio and equipped with this transmission will have the ability to travel 30 to 50 percent farther than those without it on the same amount of fuel.

For example, the engine in a vehicle having a conventional automatic transmission usually must revolve 3400 R.P.M. while the rear wheels (18 inch outer diameter) are revolving 1000 R.P.M. or approximately 83 miles per hour. The same vehicle having a 1-to-1 ratio differential but equipped with the transmission of this invention and traveling at the same speed requires an engine speed of only 1000 R.P.M. From standstill, the transmission starts out at a fairly low motor to rear wheel ratio and rapidly adjusts itself to the demands placed on it. Since the gear ratio in the differential can either be eliminated or greatly reduced through the use of this transmission, it means the engine propelling the vehicle will revolve from about 30 to 50 percent less (in overall travel), thereby increasing engine life and consuming less fuel.

The elimination of oil pumps and bands plus the overall simplicity of design enables the transmission of this invention to perform with less maintenance and repair. Due to the wide range of gear ratios available automatically and due to the simplicity of design, this transmission lends itself for use in a wide range of applications where rotating power is used to propel the heaviest to the lightest carriers at different speeds and under varying conditions.

What is claimed is:

1. A fluid-driven worm drive automatic transmission capable of providing low motor to drive wheel ratios and substantially reducing differential gear reductions and having as distinct operational units a fluid drive torque converter, a hydraulically driven and controlled worm drive unit and a gear box unit, said transmission including an output shaft driven by said fluid-controlled worm drive unit and turbine-driven first planetary gear system with connected carrier and associated engine driven primary pump attached thereto at one end, and a primary pump-driven second planetary gear system with carrier and connected oil pump having an annulus gear attached at the other end of said output shaft in a position adjacent to said torque converter, thereby providing a base for driving at least two pinion gears, said pinion gears causing rotation of a sun gear of said second planetary gear system and its attached oil pump at a speed faster than that of said driven first planetary carrier and associated primary pump during operation thereof, whereby:
   the rotational speed of said sun gear of said second planetary gear system and its connected oil pump is directly proportional to the rotational speed of both said driven first planet carrier and said output shaft;
   the torque required to drive said first planetary gears and oil pump is applied to said output shaft by said second planetary annulus gear and output shaft return housing; and
   said second planetary gear system drives its oil pump with added speed during acceleration and wherein said second planetary gear system is connected to a rotatable pump hub having retractable vanes within an ellipsoid-shaped housing having an intake chamber and an exhaust chamber at each end of said ellipsoid to provide dual intake and exhaust areas each of which has connected thereto an oil motor with appropriate connecting feedlines, said oil pump housing, oil feedlines and oil motors being connected to said first planet worm carrier.

2. A transmission as in claim 1 wherein said second oil pump draws and expels a portion of oil from and to said torque converter via oil ports provided therein and through pump splines and the respective planet carrier shafts into said oil pump intake and exhaust chamber areas.

3. A transmission as in claim 1 wherein said second oil pump draws and expels a portion of oil from and to said torque converter via oil ports provided therein and through pump splines and the respective planet worm carrier shaft and sun gear shaft.

* * * * *